United States Patent [19]

Göhring et al.

[11] Patent Number: 4,820,465
[45] Date of Patent: Apr. 11, 1989

[54] METHOD FOR PRODUCING A SHAPED SYNTHETIC MEMBER

[76] Inventors: Karl Göhring, Leonorenstr. 11, 7000 Stuttgart 70; Hermann Kress, Schubertweg 1, 7024 Filderstadt 1, both of Fed. Rep. of Germany

[21] Appl. No.: 34,538

[22] Filed: Apr. 6, 1987

[30] Foreign Application Priority Data

Apr. 8, 1986 [DE] Fed. Rep. of Germany ....... 3611688

[51] Int. Cl.$^4$ .................. B29C 43/02; B29C 69/02
[52] U.S. Cl. ................................ 264/119; 264/120; 264/126; 264/323; 264/325
[58] Field of Search ............... 264/119, 118, 120, 125, 264/126, 127, 105, 322, 323, 325, 109

[56] References Cited

U.S. PATENT DOCUMENTS 2,439,966 4/1948 Dinzl .

FOREIGN PATENT DOCUMENTS 3115917 11/1987 Fed. Rep. of Germany .

Primary Examiner—Jan H. Silbaugh
Assistant Examiner—Mary Lynn Fertig
Attorney, Agent, or Firm—Fred Philpitt

[57] ABSTRACT

In a method for producing shaped synthetic members, one begins with superficially plasticized synthetic granulated material in manner known per se. This is sintered to form a preform in a first operation in a preliminary chamber. The preform is then extruded by way of a narrow nozzle into a moulding cavity, the nozzle cross section being so narrow that on the way between the preliminary chamber and the moulding cavity, the individual granular particles must be deformed mechanically. The moulding cavity is then filled by one or more thin strands, which consist of solid, but mechanically deformed and superficially plasticized granulated particles.

1 Claim, 1 Drawing Sheet

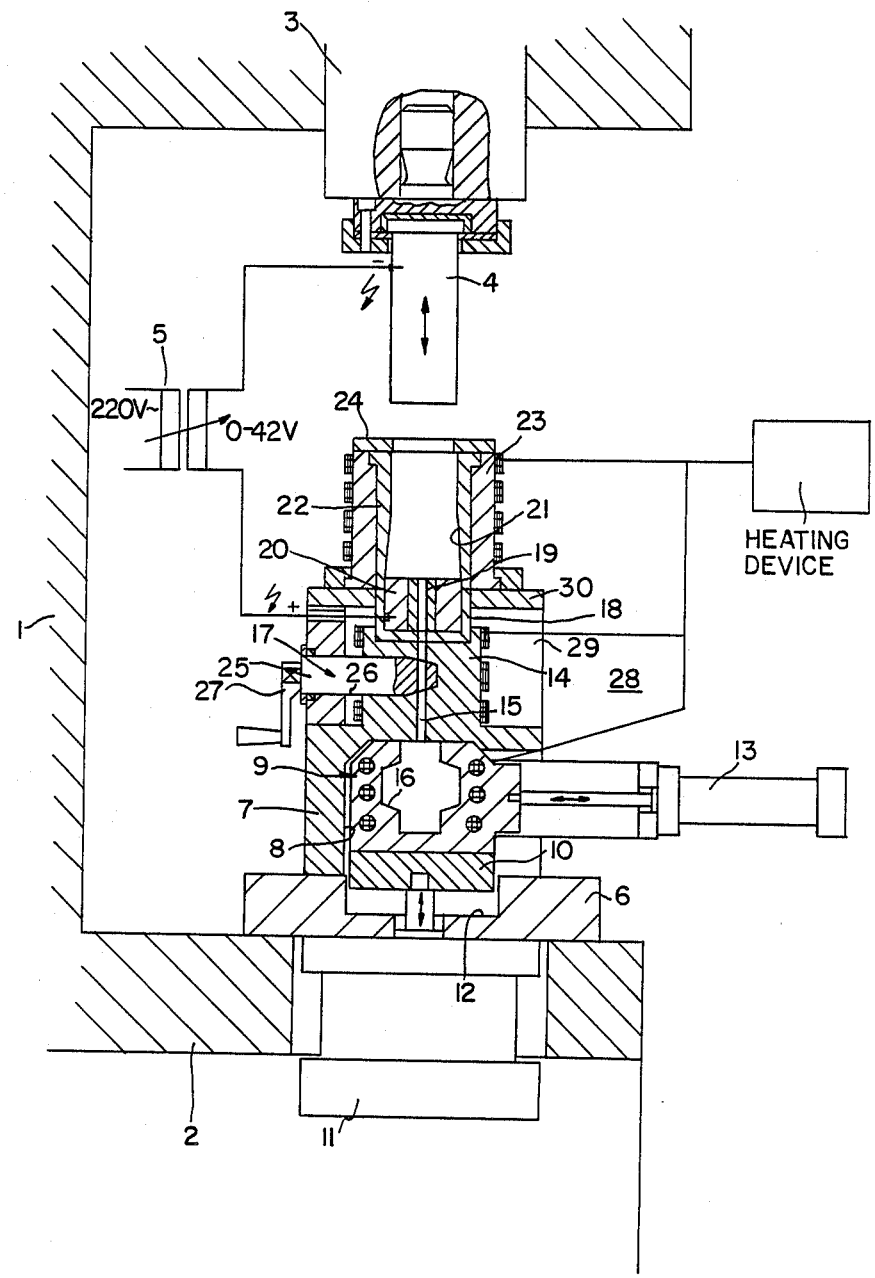

METHOD FOR PRODUCING A SHAPED SYNTHETIC MEMBER

The invention relates to a method for producing a shaped synthetic member, in which granulated particles first of all superficially plasticised in a preliminary chamber are sintered to form a preform and the latter is then compression moulded in a moulding cavity.

The invention also relates to an apparatus for producing a shaped synthetic member, with a press comprising a press plunger, with a preliminary chamber, in which superficially plasticised granulated particles are sintered by the press plunger to form a preform and with a moulding cavity in which the preform is compression moulded as the press plunger advances further.

A method of this type and an apparatus of this type are known from German PS 31 15 917. In this case the preliminary chamber is formed on the one hand by the press plunger and on the other hand by a counter-plunger. After completion of the preform, both pistons travel within a cylinder to a chamfer of large surface area of a moulding cavity, into which the preform is then compressed by the advancing press plunger. As mentioned, the chamfer of the moulding cavity is intentionally designed with a large surface area, in order to facilitate the introduction of the only superficially plasticised, substantially largely solid material into the moulding cavity and the maintenance of the pressure exerted by the press plunger in the moulding cavity. In this method or this apparatus, the mechanical properties of the shaped synthetic member produced in the moulding cavity correspond in the best case to the mechanical properties which the preform would already have when the pressure is released and at the time of cooling.

It is the object of the present invention to provide a method and an apparatus of the afore-mentioned type so that the mechanical properties of the ultimately produced shaped synthetic member exceed those properties which the initial material already has.

As regards the method, this object is achieved due to the fact that on the way between the preliminary chamber and the moulding cavity, the material of the preform is extruded through at least one narrow nozzle, the dimensions of the effective nozzle cross section being smaller than the dimensions of the individual granular particles so that on passing through the nozzle the granular particles are deformed mechanically and the moulding cavity is filled successively by at least one thin strand, which consists of superficially plasticised, mechanically deformed granulated particles.

Thus, contrary to the teaching of German PS 31 15 917, according to the invention the preform is extruded through one or more extremely narrow nozzle cross sections, in which case each individual granulated particle, which is solid apart from the surface, is subjected to mechanical deformation. Surprisingly it has proved that from the thin strands, which fill the moulding cavity in succession in the method according to the invention and which indeed essentially consists of solid, but mechanically deformed granulated particles, a cohesive shaped member can again be constructed; this is despite the pressure transmission from the preliminary chamber into the moulding cavity, which has apparently become more difficult over the thin cross section. It is likewise surprising that the shaped synthetic member produced in the moulding cavity even exceeds the mechanical qualities, which are produced in the object of German PS 31 15 917. Obviously the increase in the mechanical quality is based on a consolidation of the granulated particles, which is connected with the mechanical deformation in the narrow nozzle.

In one embodiment of the method according to the invention the nozzle/nozzles remains/remain closed until the completion of the preform. In this way it is possible first of all to complete the preform with a certain pressure effect, before further pressing-out in the moulding cavity takes place (possibly under increased pressure).

As regards the apparatus, the above-described object is achieved due to the fact that provided in the path between the preliminary moulding chamber and the moulding cavity is at least one narrow nozzle, the dimensions of the effective nozzle cross section being smaller than the dimensions of the individual granulated particles. With this apparatus it is possible to achieve the advantages achieved above for the method according to the invention, on the end product.

Appropriately the effective nozzle cross section of the narrow nozzle is variable. Thus the apparatus can be adapted to various grain sizes of the granular material processed, since in the case of a smaller grain size, the effective nozzle cross section must also be reduced.

In this case, according to one embodiment of the invention, the narrow nozzle comprises a mandrel which can be rotated, which comprises a through hole extending at right angles to the axis of rotation, which by rotation of the mandrel can be brought into greater or lesser alignment with a channel connecting the preliminary chamber to the moulding cavity.

Moreover, the nozzle may appropriately be heated, so that no excessive cooling of the material takes place on the critical path between the preliminary chamber and the moulding cavity.

For the same reasons the channel connecting the preliminary chamber to the moulding cavity can be heated.

One possibility of bringing about the afore-mentioned superficial plasticisation of the granulated particles in the preliminary chamber consists of electrical resistance heating. In known apparatus of this type, the base of the preliminary chamber is formed by an electrode, by means of which the current is sent through the preform. In this case it is appropriate if the channel is guided through the electrode.

As an alternative to one or more nozzles which have a continuously variable effective nozzle cross section, it may also be provided that the nozzle(s) is (are) able to be exchanged.

If the nozzle(s) is (are) able to be closed off, then in the manner already described above, first of all a certain pressure can be built up in the preliminary chamber when producing the preform, before the preform is then extruded into the moulding cavity through the narrow nozzle.

One embodiment of the invention will be described in detail hereafter with reference to the drawings: the single figure shows diagrammatically a vertical section through an apparatus for producing shaped members from granulated synthetic material.

The apparatus illustrated uses a conventional press, whereof the frame 1, press table 2 and working ram 3 are shown only diagrammatically and partially. Attached to the working ram 3 in an electrically insulated manner is a metal press plunger 4, which is connected to one pole of an adjustable direct-current supply 5.

Screwed to the press table 2 is a support 6, which in turn supports a retaining block 7 standing between two side cheeks 29. Located in a recess 8 in the retaining block 7, which recess is open towards the side and on the underside, is a two-part heated mould 9, which is pressed positively against the upper side of the recess 8 by an auxiliary ram 10. Due to this the mould 9 is simultaneously locked in the closed position. The auxiliary ram 10 is actuated by way of a servo-motor 11 and for opening the mould can be lowered together with the mould 9 in a downwards direction into a position in which it comes to bear against a recess 12 in the support 6. In this position, the right-hand half of the mould 9 in the drawing can be moved away by means of a further servo-motor 13.

A vertical channel 15, which opens into the moulding cavity 16, passes through a neck-shaped region 14 of the retaining block 7 which is located above the mould 9 and is heated. Located in the course of the channel 15 is an adjustable nozzle, which is provided generally with the reference numeral 17 and whereof the exact construction and operation will be described hereafter. The channel 15 passes through a cup-like insulation layer 18 located above the neck-shaped region 14 of the retaining block 7 and within a hardened bush 19 through a further electrode 20, which is connected to the second pole of the adjustable direct-current supply 5.

The electrode 20 forms the base of a preliminary chamber 21, which is defined radially by a hardened insert 22. This is inserted in a heated part 23, which is screwed to a cross plate 30 connecting the cheeks 29 at the top. An annular plate 24 attached to the heated part 23 fixes the insert 22 in the axial direction.

The adjustable nozzle comprises a mandrel 25, which tapers conically at its inner end. The mandrel 25 may be rotated by means of a crank handle 26 in a complementary mounting bore 27 in the retaining block 7. Passing through the tapering, inner region of the mandrel 25 is a through-hole 28, whereof the axis extends at right angles to the axis of rotation of the mandrel 25.

The arrangement is such that by rotating the mandrel 25, the through hole 28 can be brought into greater or lesser alignment with the channel 15. A variable overlapping area is produced in this way between the channel 15 and the through hole 28, which area represents the narrowest cross section in the path between the preliminary chamber 21 and the moulding cavity 16. This narrowest cross section is in this case referred to as "effective nozzle cross section".

The method of operation of the above-described apparatus will become clear hereafter, when the production of a concrete example of a shaped synthetic member is described in detail.

First of all, a basic mixture is produced from 80% by weight of a powder, which consists of ultra high molecular polyethylene, and of 20 g graphite powder (an electrically conducting powder which is also known as "conducting carbon black"). 20 g of this mixture are again mixed intensively with 80 g granulated particles, the material of the granulated particles being consistent with the material of the above-mentioned ultra high molecular polyethylene powder.

A corresponding quantity of the last-mentioned mixture, which is thus composed of granulated particles and powder mixture, is supplied to the preliminary chamber 21 of the afore-described apparatus. The nozzle 17 or its mandrel 25 is first of all rotated so that the through hole 25 lies transversely, thus no effective nozzle cross section is available for the passage of material between the preliminary chamber 21 and the moulding cavity 16. In the apparatus used, the diameter of the preliminary chamber amounted to approximately 45 mm; the length of the preform amounts to approximtely 70 mm.

Now the press plunger 4 is introduced into the preliminary chamber 21, until a pressure of approximately 20 kp/mm$^2$ is reached. In this case, the mixture containing granules and located in the preliminary chamber 21 is compressed. Then the direct-current supply 5 is activated. The voltage is adjusted so that with the aforementioned dimensions of the preliminary chamber, a current of approximately 6 A flows. In the apparatus used, the associated voltage amounts to approximately 24 volts. The surfaces of the individual granulated particles are softened due to resistance heating; at the same time the synthetic material powder sinters which, as above-mentioned, had been mixed with the conducting graphite powder. Due to this the actual sintering of the contents of the preliminary chamber 21 to form a preform takes place.

The conclusion of the sintering process can be ascertained by a drop in the current flowing through the preform. The reasons for this drop in current are not yet completely clear; probably it is based on a "thinning" of the conducting graphite powder due to the fact that synthetic material in which the graphite powder is increasingly embedded, sinters.

Now the pressure acting on the preform in the preliminary chamber 21 is increased to approximately 60 kp/mm $^2$. The mandrel 25 of the nozzle 17 is brought into a rotary position which was determined previously in accordance with the grain size of the granular material, which was approximately 3 mm, so that the granulated particles can only pass this point with mechanical deformation. Under the continuing pressure of the press plunger 4, the earlier preform now enters the moulding cavity 16 as a thin strand, which consists of mechanically deformed, but solid granular particles with a soft surface. This strand fills the moulding cavity 16, in which case the surface of various regions of the strand lie one against the other and join one to another. Under the influence of the pressure of the press plunger 4 acting through the channel 15 and the nozzle 17, a cohesive, inclusion-free shaped member is thus formed in the moulding cavity 16, whereof the mechanical strength considerably exceeds that of the initial synthetic material.

After the formation of the shaped synthetic member in this way is terminated, the mould 9 is immediately lowered into the mould release position by means of the auxiliary ram 10. After moving away the half of the mould 9 located on the right-hand side in the drawing, the mould 9 can be emptied without delay, without the shaped member suffering any thermal damage. In the afore-described method of manufacture, the synthetic material is brought to a homogeneous temperature so that no internal stresses occur within the shaped member.

We claim:

1. A method for producing a shaped synthetic member comprising the steps of
   (a) introducing granulated particles into a first zone and heating the granulated particles while in this first zone to plasticize the surface of the granulated particles, (b) extruding the surface-plasticized granulated particles from said first zone into a spaced apart moulding cavity through at least one passageway in the form of at least one thin strand until the molding cavity is filled, (c) then compression molding the material thus introduced into said molding cavity to produce said shaped synthetic member, (d) controlling the size of said at least one passageway so that its cross section is smaller than the cross section of the individual granulated particles, whereby the granulated particles are mechanically deformed as they pass from said first zone to said moulding cavity.

* * * * *